(No Model.)

J. P. BLONDEAU.
COMBINED GRASS RECEIVER AND DUMPER FOR LAWN MOWERS.

No. 428,371. Patented May 20, 1890.

Witnesses
Geo. W. Hinton
Francis M. Rosegate

Inventor
Jules P. Blondeau

UNITED STATES PATENT OFFICE.

JULES P. BLONDEAU, OF ST. JOSEPH, MISSOURI.

COMBINED GRASS RECEIVER AND DUMPER FOR LAWN-MOWERS.

SPECIFICATION forming part of Letters Patent No. 428,371, dated May 20, 1890.

Application filed September 7, 1889. Serial No. 323,280½. (No model.)

*To all whom it may concern:*

Be it known that I, JULES P. BLONDEAU, a citizen of the United States, residing at St. Joseph, in the county of Buchanan and State of Missouri, have invented a new and useful Combined Grass Receiver and Dumper for Lawn-Mowers, of which the following is a specification.

My invention relates to that class of grass-receivers which are designed to catch and carry the grass while the lawn-mower is being operated.

The objects of my invention are, first, to construct a combined grass receiver and dumper which will catch and carry the grass while the lawn-mower is being operated, thereby avoiding all the labor of raking and consequent injury to the sod; second, to so construct a combined grass receiver and dumper that it will be held rigidly in place while receiving grass, thereby preventing the annoyance caused by the receiver oscillating from side to side; third, to provide a quick and easy means of dumping or emptying the receiver when desired; fourth, to so construct a combined grass receiver and dumper that it may quickly and easily be put in proper position for receiving grass after being dumped or emptied; fifth, to provide an easy means of quickly attaching and removing said grass-receiver from the lawn-mower when desired, and, sixth, to provide an easy means for adjusting said combined grass receiver and dumper to suit the various heights of lawn-mower handles. I attain these objects by the mechanism illustrated in the accompanying drawings, in which—

Figure 1:
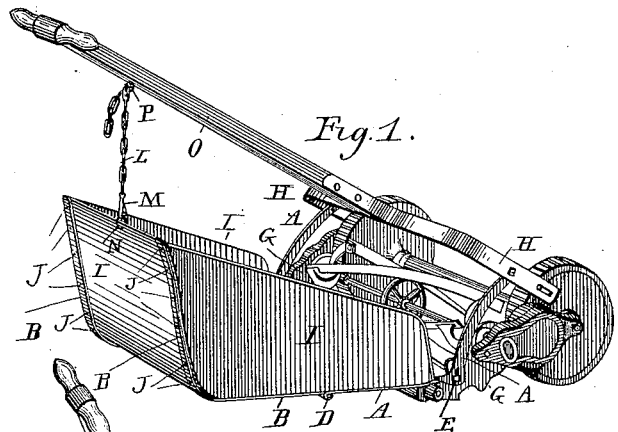
Figure 2:
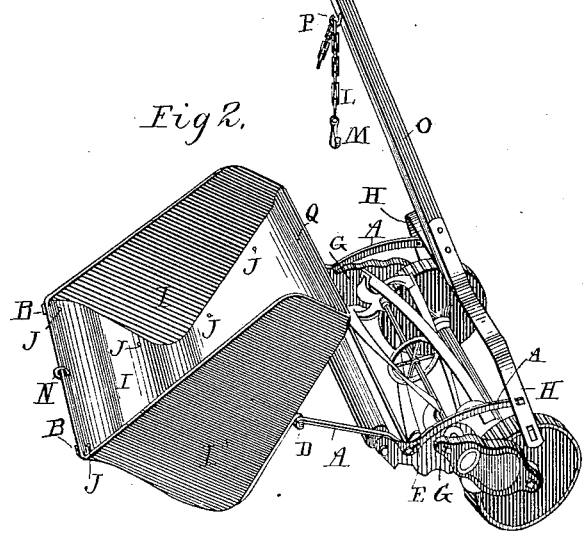
Figure 3:
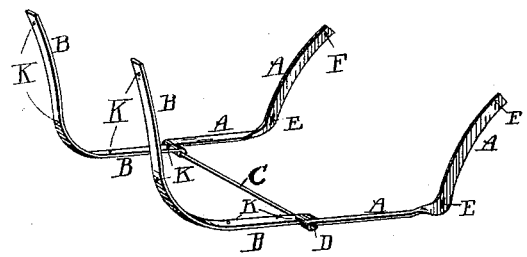

Figure 1 is a perspective view of my invention as it appears while receiving grass. Fig. 2 is a perspective view of my invention as it appears while in the act of dumping or emptying. Fig. 3 is a perspective view of frame-work with pan removed.

Similar letters refer to similar parts throughout the several views.

Referring to Fig. 3, the two bent bars A A, the two curved bars B B, the rod C, and nut D constitute the frame-work of my invention. Said frame-work is made, preferably, of wrought-iron, though it may be constructed of any other suitable material. Said framework is securely fastened to the lawn-mower of any ordinary construction in the following manner: Two ordinary bolts pass, respectively, through the side plates G G of mower, then through slots E E in bars A A. Two ordinary bolts pass, respectively, through holes F F in bars A A, and then through handle-braces H H of mower, all of said bolts being securely fastened by nuts in the usual manner. While I have shown and described the attachment of bars A A to the lawn-mower in the foregoing manner, it is evident that I wish to reserve the right to so vary the shape of bars A A that they may be secured in a substantial manner to other variously-shaped lawn-mowers.

The pan or grass-receiver I, which is preferably made of sheet metal, is securely attached to the two bars B B by means of rivets J J, passing through pan I and holes K K in bars B B, though any other suitable means of fastening pan I to bars B B may be used. The bottom of pan I is curved upward, as shown at Q Q, to prevent grass from sliding forward. The edges of pan I are wired in the usual manner for the purpose of stiffening them.

Referring to Fig. 1, in the operation of my invention the pan or grass-receiver I is attached to the lawn-mower, as already described. Said pan I is then raised to the proper position for receiving grass by means of chain L. To the lower end of chain L is securely attached snap-hook M, snap-hook M being hooked into ring N, ring N being securely fastened to pan I. The position of pan I is adjusted to suit the height of mower-handle O by hooking the desired link of chain L into hook P, hook P being securely fastened to mower-handle O in the usual manner. Pan I may be dumped or emptied when desired, as seen in Fig. 2, by unfastening snap-hook M from ring N and rotating upward the mower-handle O. Bars A A, being hinged to bars B B forward of the center of gravity of the pan by means of rod C, cause pan I to tip backward, thereby dumping contents of pan I. By the downward rotation of mower-handle O the pan I assumes a horizontal position, when snap-hook M may be quickly attached to ring N and pan I will again be in position for receiving grass. Pan I and bars B B may be quickly and easily unhinged from bars A A by unscrewing nut D and removing rod C, after which the mower may be operated while carrying only the two bars A A, said bars A A being no hinderance to operation of lawn-mower.

Having fully described my invention, what I claim as new and original, and wish to secure by Letters Patent, is—

The combination, with the mower-frame and the handle-bar O, having bifurcated ends H, of the side bars A A, pivoted at E to the mower, their forward ends pivoted to the bifurcated ends H of the handle O, the receiving-pan I, hinged forward of its center of gravity to the rear ends of the arms A A, and means for detachably connecting the rear portion of said pan to the handle-bar O, substantially as shown and described.

JULES P. BLONDEAU.

Witnesses:
FRANCIS M. POSEGATE,
GEO. W. HINTON.